United States Patent
Kubo

(10) Patent No.: US 7,079,248 B2
(45) Date of Patent: Jul. 18, 2006

(54) POLARIZATION STATE MEASURING APPARATUS

(75) Inventor: Teruhiro Kubo, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/947,330

(22) Filed: Sep. 23, 2004

(65) Prior Publication Data
US 2005/0254039 A1    Nov. 17, 2005

(30) Foreign Application Priority Data
May 11, 2004    (JP) ............................. 2004-140561

(51) Int. Cl.
*G01J 4/00*    (2006.01)
(52) U.S. Cl. ...................................... 356/364
(58) Field of Classification Search ......... 356/364–369
See application file for complete search history.

(56) References Cited

U.S. PATENT DOCUMENTS

| | | | | |
|---|---|---|---|---|
| 5,661,560 A | * | 8/1997 | Ozaki | .................. 356/364 |
| 6,177,995 B1 | | 1/2001 | Compain et al. | |
| 6,384,916 B1 | | 5/2002 | Furtak | |

FOREIGN PATENT DOCUMENTS

| | | |
|---|---|---|
| JP | 06-018332 | 1/1994 |
| JP | 09-072827 | 3/1997 |
| JP | 2001-520754 | 10/2001 |
| JP | 2003-508772 | 3/2003 |

* cited by examiner

*Primary Examiner*—Tu T. Nguyen
(74) *Attorney, Agent, or Firm*—Staas & Halsey LLP

(57) ABSTRACT

A polarization state measuring apparatus of the present invention branches an input signal light into a plurality of signal lights by optical couplers, gives polarization and phase shift which are different from each other, to the signal lights by a plurality of optical elements arranged on optical branch paths, detects the power of each of the signal lights by the corresponding light receiving elements, and after adjusting at least differences in the optical branch paths, processes electrical signals output from the light receiving elements, to acquire information related to a polarization state of the input signal light. As a result, it is possible to provide a small size polarization state measuring apparatus which can correct differences in arrival times of the signal lights to the light receiving elements, to thereby measure the polarization state of the input signal light with high accuracy.

12 Claims, 4 Drawing Sheets

POLARIZATION STATE MEASURING APPARATUS

BACKGROUND OF THE INVENTION

1. Field of the Invention

The present invention relates to a polarization state measuring apparatus for detecting a polarization state of an input signal light by measuring the Stokes parameter or the like, and in particular relates to a polarization state measuring apparatus for achieving the reduction in measurement accuracy deterioration which occurs due to differences in effective optical path lengths.

2. Related Art

In optical communication systems, as means for increasing the transmission capacity, it is known to increase the communication speed per channel. However, in a range where a bit rate of signal light exceeds 10 Gb/s (gigabit/second) or 40 Gb/s, the pulse width of the signal light becomes several tens of ps (picosecond). Therefore, it becomes difficult to distinguish between a "0" level and a "1" level of each bit due to waveform distortion generated due to various factors. Such waveform distortion becomes a factor for determining the main specifications such as system length. Then, when designing the system, various measures are devised for arranging parts for compensating for waveform distortion.

As a factor generating waveform distortion of signal light, there is polarization mode dispersion (PMD). This PMD is a dispersion which occurs as a result that a differential group delay (DGD) occurs between two orthogonal polarization modes, for example, due to the core of an optical fiber used as an optical transmission path becoming elliptic, or due to a lateral pressure, or to a partial temperature change and the like. For example, in the case where the optical fiber is laid in a place, such as with a submarine cable, where environmental changes are minimal, or the case where the optical fiber is laid in a place where environmental changes are severe such as along the side of a railroad, the behavior of the PMD variations is remarkably different.

PMD compensators (to be referred to as PMDC, hereunder) for compensating for the abovementioned PMD have been recently developed by various companies. A configuration of a well-known PMDC is basically a loop-back system in which the waveform distortion of signal light is monitored and a compensation amount of the PMD is controlled corresponding to the monitor result. However, it is difficult to directly and quantitatively monitor a state of waveform distortion and a generated dispersion amount. As substitute means, there is typically a method for monitoring a degree of polarization (DOP). Moreover, there are also known examples measuring the bit error rate (BER), or measuring the electrical spectrum hole burning.

The DOP can be measured by using a polarization state measuring apparatus (polarimeter). As a conventional polarization state measuring apparatus, there is known an apparatus for measuring the four Stokes parameters representing a polarization state (refer to Japanese Unexamined Patent Publication No. 6-18332, Japanese Unexamined Patent Publication No. 9-72827, Japanese National Publication No. 2001-520754, and Japanese National Publication No. 2003-508772).

FIG. 6 shows a configuration of a basic optical system of a conventional polarization state measuring apparatus as described above. In this optical system, firstly an input signal light L is branched into four at 25% each, by an optical coupler (CPL) 1. Then, a first branched light passes through a ¼ wave plate (QWP) 2 and a polarizer (POL) $3_1$ which passes therethrough only a polarized component inclined by 45° to a previously set reference plane, to be incident on a light receiving element (PD) $4_1$. A second branched light passes through a polarizer (POL) $3_2$ which passes therethrough only a polarized component inclined by 45° to the above reference plane, to be incident on a light receiving element (PD) $4_2$. A third branched light passes through a polarizer (POL) $3_3$ which passes therethrough only a polarized component parallel (or perpendicular) to the above reference plane, to be incident on a light receiving element (PD) $4_3$. A fourth branched light is directly incident on a light receiving element (PD) $4_4$.

If electric signals which are photoelectrically converted by the respective light receiving elements $4_1$, $4_2$, $4_3$ and $4_4$ to be output, are $D_Q$, $D_{45}$, $D_0$, and $D_T$, then the four Stokes parameters $S_0$, $S_1$, $S_2$ and $S_3$ are represented by the relationships shown in the following equation (1).

$$S_0 = D_T$$
$$S_1 = 2 \cdot D_0 - D_T$$
$$S_2 = 2 \cdot D_{45} - D_T$$
$$S_3 = 2 \cdot D_Q - D_T \quad (1)$$

Here, $S_0$ represents the intensity of input signal light, $S_1$ represents a horizontal rectilinear polarized component (0°), $S_2$ represents a rectilinear polarized component inclined by 45°, and $S_3$ represents a right-handed circularly polarized component. By using the above Stokes parameters $S_0$ to $S_3$, the DOP to be measured is represented in accordance with the relationship of the following equation (2).

$$DOP = \frac{\sqrt{S_1^2 + S_2^2 + S_3^2}}{S_0} \quad (2)$$

However, in the above described conventional polarization state measuring apparatus, in order to measure the four polarized components, the input signal light passes through various optical elements such as the optical coupler, the ¼ wave plate, the polarizer and the like, to be received by the light receiving element. However, since respective optical paths up to the respective light receiving elements are different to each other, differences occur between times until the input signal lights reach the light receiving elements, with a problem that the accuracy of the measured polarization state is deteriorated.

More specifically, in order to improve the measurement accuracy in the conventional polarization state measuring apparatus as described above, and to miniaturize the apparatus, the present applicants have proposed a polarization state measuring apparatus having a configuration shown in FIG. 7 (refer to Japanese Patent Application No. 2003-375749). Describing the configuration of FIG. 7 in brief, an input signal light $L_{IN}$ whose polarization state is to be measured, is sequentially incident on optical couplers 1A to 1C of a three staged configuration, and is thus branched into four signal lights having mutually equal powers. The branched signal lights are respectively propagated through any one of a first optical branch path on which the ¼ wave plate 2, the polarizer $3_1$ and the light receiving element $4_1$ are arranged, a second optical branch path on which the polarizer $3_2$ and the light receiving element $4_2$ are arranged, a third optical branch path on which the polarizer $3_3$ and the light receiving element $4_3$ are arranged, and a fourth optical branch path on which the light receiving element $4_4$ is arranged, in order to obtain the four Stokes parameters $S_0$ to $S_3$ represented by the relationship of the above described equation (1). Then, the Stokes parameters $S_0$ to $S_3$ are calculated based on the power of the signal light received by each of the light receiving elements $4_1$ to $4_4$, and thus, the polarization state of the input signal light $L_{IN}$ is obtained. Reference numeral 5 in FIG. 7 denotes a shielding wall which blocks a stray light generated between the optical components which are arranged adjacent to each other on the respective optical branch paths through which the branched lights reflected by the respective optical couplers 1A to 1C are propagated, from being propagated toward the light receiving element on the different optical branch path.

In the polarization state measuring apparatus of the prior invention as described above, since the lengths of the optical branch paths are different from each other depending on the number of optical components arranged on each of the optical branch paths, there occurs a deviation in timing at which the input signal light $L_{IN}$ is received by the respective light receiving elements $4_1$ to $4_4$, and for example, as shown in FIG. 8, a time difference $\Delta t$ occurs in output signals of the light receiving elements $4_1$ to $4_4$ corresponding to the same pulse of the input signal light $L_{IN}$.

If this time difference $\Delta t$ is estimated specifically by giving an example, in the above configuration of FIG. 7, since the optical path length of the first optical branch path is the longest, then with this length as a reference, each of differences $\Delta l_{2-1}$ to $\Delta l_{4-1}$ of the optical path lengths of the other optical branch paths is considered. Here, for example, the following values are assumed for the differences.

$\Delta l_{2-1} = -8.500414$ [mm]

$\Delta l_{3-1} = -2.909586$ [mm]

$\Delta l_{4-1} = -16.450828$ [mm]

Converting the above optical wave length differences $\Delta l_{2-1}$ to $\Delta l_{4-1}$ into time differences $\Delta t_{2-1}$ to $\Delta t_{4-1}$ of lights being propagated through the vacuum, the following values are obtained.

$\Delta t_{2-1} = -2.83543 \times 10^{-11}$ [sec]

$\Delta t_{3-1} = -9.70533 \times 10^{-12}$ [sec]

$\Delta t_{4-1} = -5.48741 \times 10^{-11}$ [sec]

If it is obtained how many data of for example 40 Gb/s signal lights are entered between the above respective time differences $\Delta t_{2-1}$ to $\Delta t_{4-1}$, then each of bit numbers $\Delta n_{2-1}$ to $\Delta n_{4-1}$ becomes as follows.

$\Delta n_{2-1} = 1.13$ [bit]

$\Delta n_{3-1} = 0.39$ [bit]

$\Delta n_{4-1} = 2.19$ [bit]

That is, there occurs the deviation of 2 bits or above between the timing at which the input signal light of 40 Gb/s is received by the light receiving element $4_4$ and the timing at which the input signal light of 40 Gb/s is received by the light receiving element $4_1$. In the future, if a system corresponding for example to 160 Gb/s can be configured, then it is assumed that the deviation of 8.7 bits being four times the above deviation will occur. Consequently, in the case where, within a time difference due to such an optical path length difference, the polarization state of the signal light being propagated through a transmission path and the like is changed, and then, the polarization dispersion is changed to exceed the proof strength of the system without compensating for this polarization state change, then a reception characteristic of the signal light is deteriorated. That is to say, if the measurement accuracy of the polarization state is reduced due to the optical path length differences between the respective optical branch paths in the polarization state measuring apparatus, then depending on the relationship between the bit rate of the signal light and a change speed of the polarization state in the transmission path and the like, it becomes difficult to realize a required reception characteristic.

In order to suppress the deviation in the light receiving timing in the polarization state measuring apparatus as described above, then for example, it is considered to adjust the positions of the light receiving elements $4_1$ to $4_4$ for each of the optical branch paths, or to arrange a crystal with large refractive index on the required optical branch path, to thereby physically match the optical path lengths with each other. However, in this case, there is a problem in that a mounting area becomes large. Furthermore, there is also a possibility of deterioration in the measurement accuracy of the polarization state, due to an insertion loss and an increase in temperature fluctuation, or a change in the polarization state.

SUMMARY OF THE INVENTION

The present invention has been accomplished in view of the above described problems and has an object to provide a small size polarization state measuring apparatus capable of correcting differences in arrival times of signal lights to light receiving elements, which occur due to differences in optical path lengths of a plurality of optical branch paths, to thereby measure a polarization state of input signal light with high accuracy.

In order to achieve the above object, a polarization state measuring apparatus of the present invention comprises: an optical branching section, a plurality of optical components, a plurality of light receiving elements, and operating means. The optical branching section branches an input signal light into a plurality of signal lights. The plurality of optical components are arranged on a plurality of optical branch paths through which the signal lights branched by the optical branching section are propagated, to give polarizations and phase differences which are different from each other, to the respective signal lights. The plurality of light receiving elements receives the signal lights respectively propagated through the optical branch paths, and outputs electrical signals whose levels are changed according to the power of each signal light. The operating means has a function of adjusting at least differences in optical path lengths of the respective optical branch paths, to process each of the electrical signals, in order to acquire information related to a polarization state of the input signal light, based on the electrical signals respectively output from the light receiving elements.

In the polarization state measuring apparatus of such a configuration, the input signal light is branched into a plurality of signal lights in the optical branching section, and each of the signal lights is propagated through the corresponding optical branch path, and is received by the light receiving element via the optical components on the optical branch path, and the electrical signals whose levels are changed according to the received optical power of each of the signal lights, are output from the respective light receiving elements to the operating means. Then, in the operating means, the electrical signals respectively output from the respective light receiving elements are adjusted after at least the differences in the optical path lengths of the respective optical branch paths are respectively processed, so that the information related to the polarization state of the input signal light is acquired.

Furthermore, the operating means comprises: time difference correcting means for receiving the electrical signals output respectively from the light receiving elements, and adjusting timing for outputting the electrical signals according to the differences in the optical path lengths of the optical branch paths, to correct differences in arrival times of the signal lights propagated through the optical branch paths to the light receiving elements; and an operation circuit which acquires information related to the polarization state of the input signal light based on the electrical signals output from the time difference correcting means.

According to the operating means as described above, the differences in the arrival times of the signal lights to the respective light receiving elements, which occur due to the differences in the optical path lengths of the plurality of optical branch paths, are corrected by the time difference correcting means, so that the information related to the polarization state of the input signal light is obtained by the operation circuit, based on the power of the signal light received at approximately matched timing in each of the light receiving elements.

According to the above described polarization state measuring apparatus of the present invention, the differences in the arrival times of the signal lights to the plurality of light receiving elements can be corrected by the operating means of a simple configuration. Therefore, it becomes possible to measure with high accuracy the polarization state of the input signal light with a small size optical system. By performing PMD compensation using such a polarization state measuring apparatus, then it becomes possible to realize an excellent reception characteristic, even in the case where an ultra-high speed signal light is transmitted, or in the case where the polarization state of the signal light propagated through the transmission path is changed extremely quickly.

Other objects, features and advantages of the present invention will become apparent from the following description of embodiments, in conjunction with the appended drawings.

DETAILED DESCRIPTION OF THE INVENTION

Figure 1:
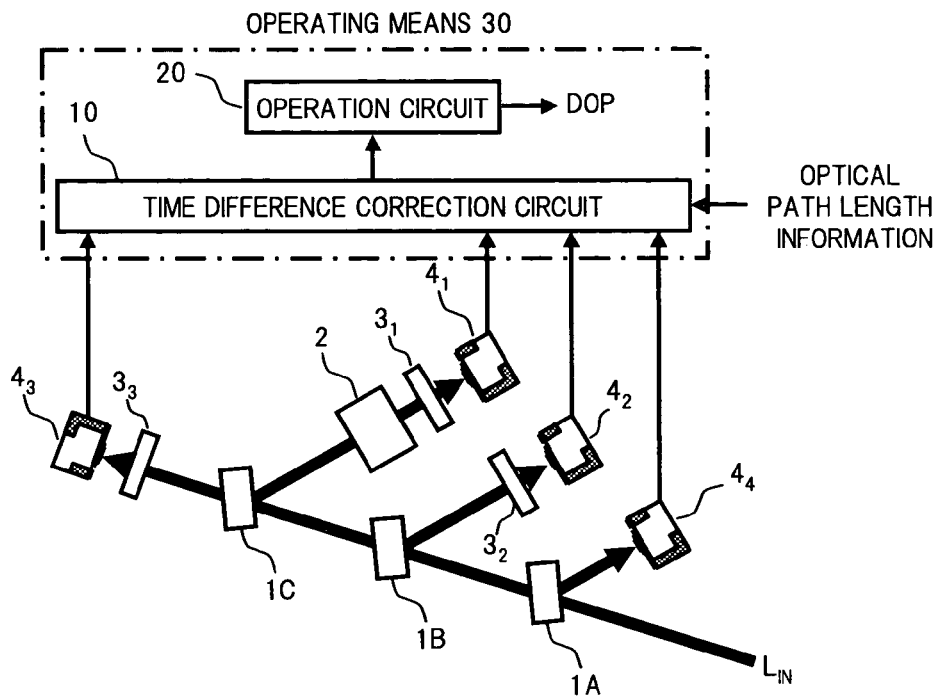
FIG. 1 is a diagram showing an overall configuration of a polarization state measuring apparatus according to one embodiment of the present invention.

Embodiments for implementing a polarization state measuring apparatus of the present invention will be described, with reference to the appended drawings. Throughout the drawings, the same reference numerals denote the same or corresponding parts.

Figure 2:
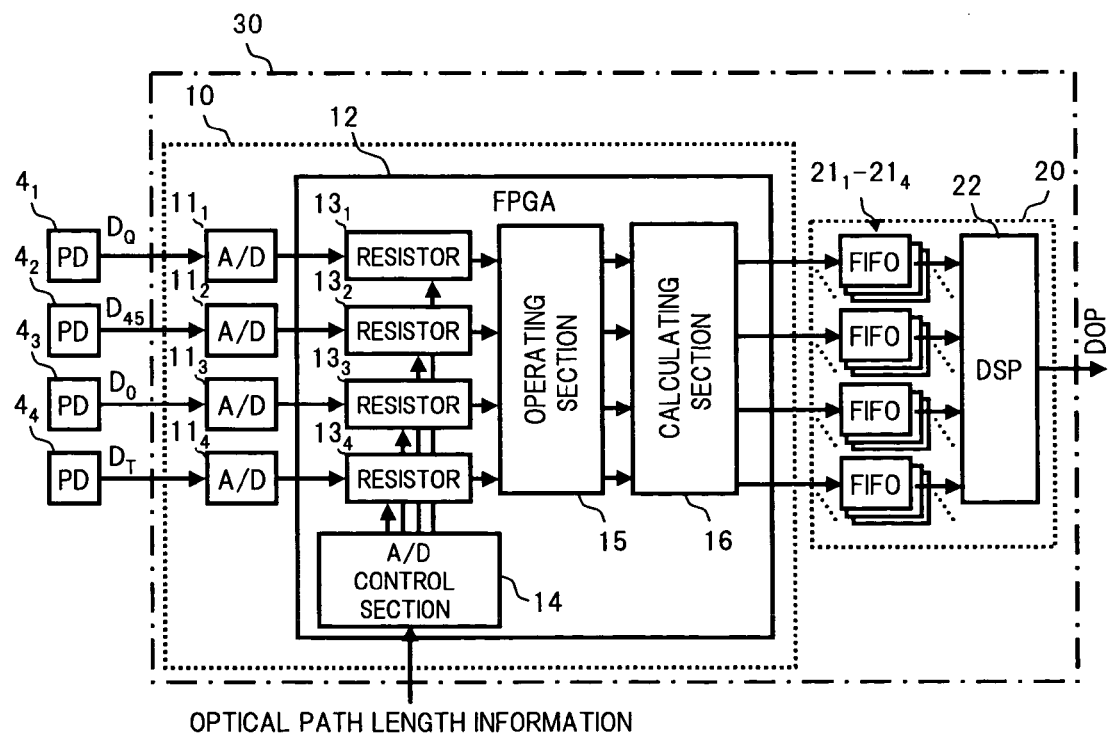
FIG. 2 is a block diagram showing a configuration of electrical circuit portion of the embodiment.

FIG. 1 is a diagram showing an overall configuration of a polarization state measuring apparatus according to one embodiment of the present invention. Further, FIG. 2 is a block diagram showing a configuration example of an electronic circuit portion in the polarization state measuring apparatus of FIG. 1.

Figure 7:
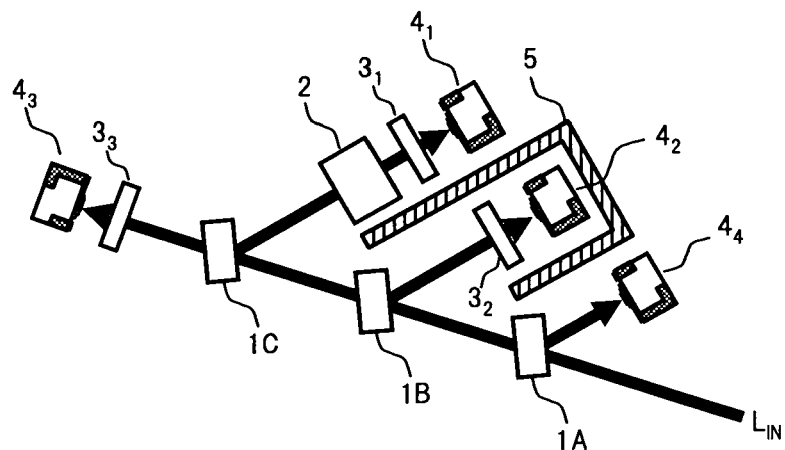
FIG. 7 is a diagram showing a configuration example of an optical system of a polarization state measuring apparatus according to a prior invention.
Figure 8:
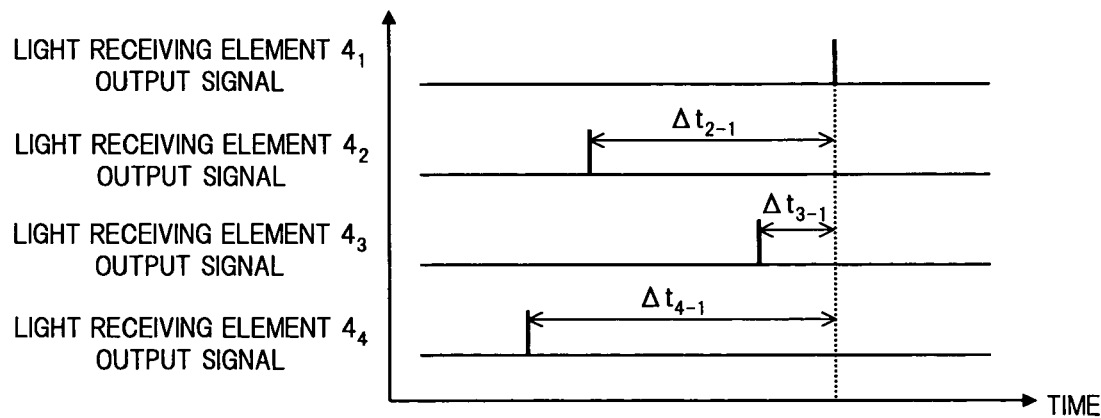
FIG. 8 is a diagram for explaining deviations in light reception timing occurring in the optical system of FIG. 7.

In each of the figures, the polarization state measuring apparatus of this embodiment comprises for example: an optical system having a configuration the same as that in the above described prior invention shown in FIG. 7; and operating means 30 which receives electrical signals $D_Q$, $D_{45}$, $D_0$, $D_T$ respectively output from light receiving elements $4_1$ to $4_4$ corresponding to four optical branch paths of this optical system. Further, the operating means 30 includes a time difference correction circuit 10 serving as time difference correcting means which receives the electrical signals $D_Q$, $D_{45}$, $D_0$ and $D_T$ to correct time differences due to differences in optical path lengths, and an operation circuit 20 which obtains a polarization state of an input signal light based on a signal corrected by this time difference correction circuit 10.

More specifically, the above described optical system comprises for example: three optical couplers 1A to 1C each obtained by forming a dielectric multilayer film on a flat plate; a ¼ wave plate 2; polarizers $3_1$ to $3_3$; and the light receiving elements $4_1$ to $4_4$. The optical couplers 1A to 1C have a three stage configuration in which an input signal light $L_{IN}$ is incident on the optical coupler 1A of a first stage, the light which has been transmitted through the optical coupler 1A, is incident on the optical coupler 1B of a second stage, and the light which has been transmitted through the optical coupler 1B, is incident on the optical coupler 1C of a third stage. Branching ratios of the incident lights in the respective optical couplers 1A to 1C (reflected light power: transmitted light power) are set to be 1:3 in the first stage, 1:2 in the second stage, and the 1:1 in the third stage. As a result, the input signal light $L_{IN}$ is branched into a reflected light of the optical coupler 1A, a reflected light of the optical coupler 1B, and a reflected light and a transmitted light of the optical coupler 1C, each having the same power. Moreover, each of the respective light incident surfaces of the optical couplers 1A to 1C is inclined to a propagation direction of the input signal light $L_{IN}$ so that an incident angle of the signal light becomes an angle away from the Brewster angle (for example 22.5° etc.).

The branched light reflected by the optical coupler 1A, is here incident directly on the light receiving element $4_4$. Further, the branched light reflected by the optical coupler 1B passes through the polarizer $3_2$ which passes therethrough only a polarized component inclined at 45° with respect to a previously set reference plane, to be incident on the light receiving element $4_2$. As the above reference plane, it is possible to set an arbitrary plane such as a bottom of a package (not shown in the figure) of the present apparatus, for example. It is preferable that the polarizer $3_2$ is arranged to be inclined at a predetermined angle to a light receiving surface of the light receiving element $4_2$, so as not to form an interference system by a light emitting plane thereof and the light receiving surface of the light receiving element $4_2$.

The branched light reflected by the optical coupler 1C passes through the ¼ wave plate 2 and the polarizer $3_1$ which passes therethrough only a polarized component inclined at 45° to the above reference plane, to be incident on the light receiving element $4_1$. Moreover, the branched light which has been transmitted through the optical coupler 1C, passes through the polarizer $3_3$ which passes therethrough only a polarized component parallel (or perpendicular) to the above reference plane, to be incident on the light receiving element $4_3$. It is preferable that, similarly to the above polarizer $3_2$, the polarizers $3_1$ is arranged to be inclined at a predetermined angle to a light receiving surface of the light receiving element $4_1$ so as not to form an interference system by a light emitting plane thereof and the light receiving surface of the opposing light receiving element $4_1$, and the polarizers $3_3$ is arranged to be inclined at a predetermined angle to a light receiving surface of the light receiving element $4_3$ so as not to form an interference system by a light emitting plane thereof and the light receiving surface of the opposing light receiving element $4_3$. Moreover, it is preferable that the ¼ wave plate 2 is also arranged to be inclined at a predetermined angle to a light incident plane of the polarizer $3_1$ so as not to form an interference system a light emitting plane and the light incident plane of the polarizer $3_1$. The electrical signals $D_Q$, $D_{45}$, $D_0$, $D_T$ indicating the powers of the signal lights received by the light receiving elements $4_1$ to $4_4$ are respectively sent to the time difference correction circuit 10 via lead wires and the like of the package (not shown in the figure) accommodating therein the optical system.

Here while omitted from the figure, similar to the above configuration shown in FIG. 7, a shielding wall may be provided, which blocks a stray light occurring between adjacent optical components, from being propagated toward the light receiving element on the different optical branch path.

The time difference correction circuit 10 includes A/D conversion circuits $11_1$ to $11_4$ respectively corresponding to the light receiving elements $4_1$ to $4_4$, and a field programmable gate array (FPGA) 12. The A/D conversion circuits $11_1$ to $11_4$ convert respectively the analog electric signals $D_Q$, $D_{45}$, $D_0$ and $D_T$ output from the light receiving elements $4_1$ to $4_4$ into digital signals. The digital signals converted in the A/D conversion circuits $11_1$ to $11_4$ are respectively given to corresponding input ports of the FPGA 12. The FPGA 12 temporarily records to store the signals output from the A/D conversion circuits $11_1$ to $11_4$ using resistors $13_1$ to $13_4$ as a recording section. From data stored in the resistors $13_1$ to $13_4$, data capable of correcting time differences due to differences in optical path lengths is selected, according to information related to the differences in the optical path lengths given to an A/D control section 14, to be given to an operating section 15 and a calculating section 16. The operating section 15 and the calculating section 16 execute floating point operations and the four fundamental operations (addition, subtraction, multiplication and division) on the data selected by the A/D control section 14, and generate data which can be processed by the operation circuit 20.

In the operation circuit 20, the digital signals corresponding to the light receiving elements $4_1$ to $4_4$, whose time differences have been corrected by the FPGA 12, are input to a digital signal processor (DSP) 22 via buffer circuits $21_1$ to $21_4$. Each of the buffer circuits $21_1$ to $21_4$ is provided with N memories in parallel which manage data in first-in first-out (FIFO), and sequentially stores the data output from the FPGA 12 which operates at C [Hz] in each memory and then outputs the data, to thereby give data signals of C×N [Hz] to the DSP 22. The DSP 22 executes calculations of the Stokes parameters $S_0$ to $S_3$ and the DOP in accordance with the above relationships of equation (1) and equation (2).

In the polarization state measuring apparatus of the above described configuration, the input signal light $L_{IN}$ whose polarization state is to be measured, is sequentially incident on the optical couplers 1A to 1C of the three stage configuration, to be branched into four signal lights having mutually equal powers. The signal lights branched by the optical couplers 1A to 1C, are respectively propagated through any one of: a first optical branch path on which the ¼ wave plate 2, the polarizer $3_1$ and the light receiving element $4_1$ are arranged; a second optical branch path on which the polarizer $3_2$ and the light receiving element $4_2$ are arranged, a third optical branch path on which the polarizer $3_3$ and the light receiving element $4_3$ are arranged, and a fourth optical branch path on which the polarizer $4_4$ is arranged, in order to obtain the four Stokes parameters $S_0$ to $S_3$ represented by the relationship of the equation (1). The number of components through which the signal light passes after it is branched by the optical coupler until it is received by the light receiving element is two in the first optical branch path, one in the second and third optical branch paths, and zero in the fourth optical branch path. Therefore, differences occur in required optical path lengths for the respective optical branch paths. Consequently, a mounting area of the present apparatus differs depending on which of the first to fourth optical branch paths the four signal lights branched by the optical couplers 1A to 1C are sent to. Therefore, in the present embodiment, in order to minimize the mounting area of the optical system, taking into consideration the above differences in the optical path lengths, for example, the reflected light by the optical coupler 1A of the first stage is sent to the fourth optical branch path, the reflected light by the optical coupler 1B of the second stage is sent to the second optical branch path, the reflected light by the optical coupler 1C of the third stage is sent to the first optical branch path, and the transmitted light through the optical coupler 1C of the third stage is sent to the third optical branch path.

The signal light is given to each of the optical couplers 1A to 1C at the incident angle away from the Brewster angle so that the phase shift occurring between p/s waves of the signal light branched by each of the optical couplers is reduced. Furthermore, a part of the signal light being propagated through each of the first through fourth optical branch paths, is reflected, when the signal light is incident on each of the optical components arranged on each of the optical branch paths. However, since a reflection surface of the optical component is arranged to be inclined at the predetermined angle to the light emitting plane of the pre-stage optical component, such a condition where interference is formed to occur the multi-reflection, is avoided. Further, by providing the shielding wall (not shown in the figure), a situation where the reflected light at the adjacent optical components becomes a stray light to be incident on the light receiving elements on the other optical branch path, is prevented.

Figure 3:
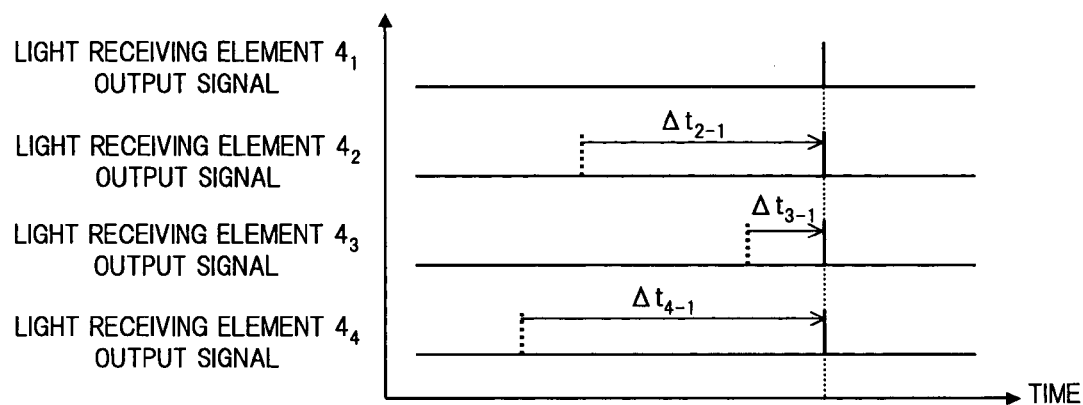
FIG. 3 is a diagram for explaining an operation for correcting time differences in the embodiment

The signal light propagated through each of the first through fourth optical branch paths is received by each of the light receiving elements $4_1$ to $4_4$ and converted into the electrical signal whose level is changed according to the power, to be sent to the time difference correction circuit 10. In the time difference correction circuit 10, the output signal from each of the light receiving elements $4_1$ to $4_4$ is converted into a digital value by each of the A/D conversion circuits $11_1$ to $11_4$, and is then given to the corresponding input port of the FPGA 12. In the FPGA 12, the data output from each of the A/D conversion circuits $11_1$ to $11_4$ is temporarily recorded in each of the resistors $13_1$ to $13_4$, and stored at a period corresponding to the operation frequency C [Hz]. From the data stored in the resistors $13_1$ to $13_4$, the data recorded in different positions (times) for each of the respective resistors $13_1$ to $13_4$ is read out by the A/D control section 14, according to the information related to the differences in the optical path lengths of the first through fourth optical branch paths of the optical system. As a result, for example as shown in FIG. 3, data in which correction has been made on time differences $\Delta t_{2-1}$, $\Delta t_{3-1}$ and $\Delta t_{4-1}$ due to the differences in optical path lengths of the first through fourth optical branch paths, is given to the operating section 15 and the calculating section 16. In the operating section 15 and the calculating section 16, in order to enable the operation processing of the DOP in the later stage operation circuit 20, the floating-point operations and the four fundamental operations (addition, subtraction, multiplication and division) are executed on the data read out from the respective resistors $13_1$ to $13_4$, and the results are then output from required ports of the FPGA 12.

The data signals of C [Hz] which are output from the FPGA 12 corresponding to the light receiving elements $4_1$ to $4_4$ are sent to the DSP 22 via the buffer circuits $21_1$ to $21_4$ each provided with N memories in parallel. As a result, the data signals of C×N [Hz] each corresponding to the bit rate of the input signal light $L_{IN}$ are given to the DSP 22. Then, in the DSP 22, in accordance with the relationships of the equation (1) and equation (2), the operation of the Stokes parameters $S_0$ to $S_3$ and the DOP is executed.

According to the polarization state measuring apparatus of the present embodiment as described above, the differences in the arrival times of the signal lights to the light receiving elements $4_1$ to $4_4$, which occur due to the differences in the optical path lengths of the first through fourth optical branch paths, are corrected by the time difference correction circuit 10 of a simple configuration. Therefore, it is possible to measure with high accuracy the polarization state of the input signal light $L_{IN}$ with a small size optical system. By performing the PMD compensation using such a polarization state measuring apparatus, It becomes possible to realize an excellent reception characteristic, even in the case where an ultra-high speed signal light exceeding 40 Gb/s is transmitted, or in the case where the polarization state of the signal light being propagated through the transmission path is changed extremely quickly.

Figure 4:
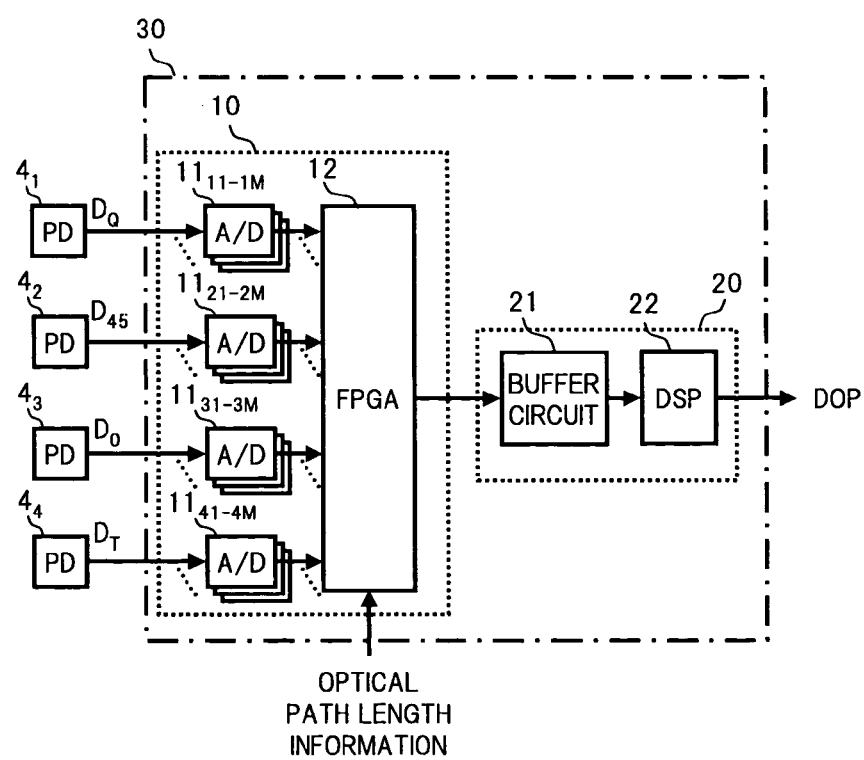
FIG. 4 is a block diagram showing another configuration example related to the embodiment
Figure 5:
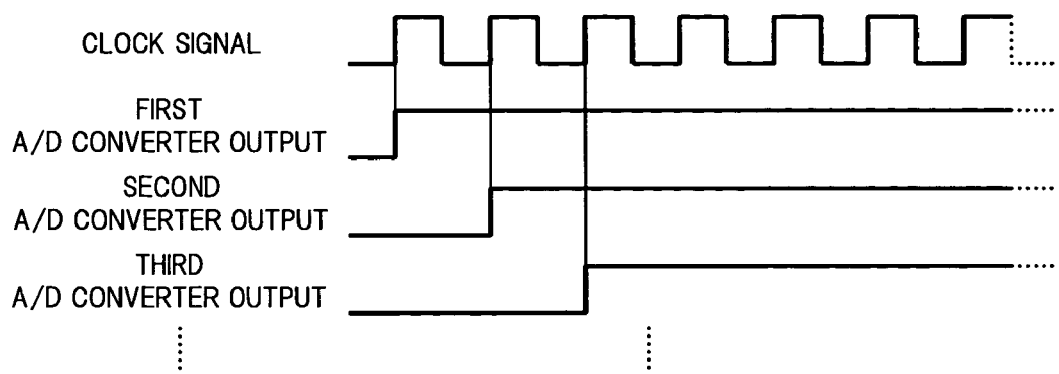
FIG. 5 is a diagram for explaining an A/D conversion operation in the circuit structure of FIG. 4.
Figure 6:
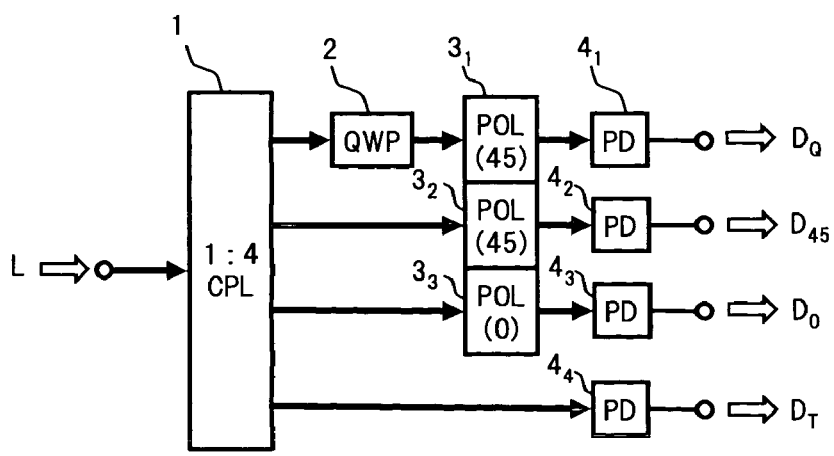
FIG. 6 is a diagram showing a configuration of a basic optical system of a conventional polarization state measuring apparatus.

In the above described embodiment, the configuration has been such that the data corresponding to each of the light receiving elements $4_1$ to $4_4$ is respectively recorded to be stored in each of the resistors $13_1$ to $13_4$ inside the FPGA 12, and the required data is selected according to the optical path length information, to correct the time differences due to the differences in the optical path lengths. However, the configuration of the time difference correction device according to the present invention is not limited to the above described example. For example, as shown in FIG. 4, M A/D conversion circuits $11_{11-1M}$ to $11_{41-4M}$ may be provided in parallel respectively corresponding to the output signals from the light receiving elements $4_1$ to $4_4$, to give the data signals converted by the A/D conversion circuits $11_{11-1M}$ to $11_{41-4M}$ to the required input ports of the FPGA 12. In this case, each of the M A/D conversion circuits, as shown in FIG. 5, is synchronized with a clock signal having the frequency corresponding to the bit rate of the input signal light $L_{IN}$, and samples, at timing different to the clock signal, the output-signal from each of the light receiving elements to perform the A/D conversion. Then, in the FPGA 12, according to the optical path length information, from the output data of each of the A/D conversion circuits $11_{11-1M}$ to $11_{41-4M}$ respectively corresponding to the light receiving elements $4_1$ to $4_4$, data capable of correcting the time differences due to the differences in optical path lengths is selected. With such a configuration, a function and an effect the same as those in the above embodiment can be obtained.

Further, the configuration has been such that the data signals output from the FPGA 12 which operates at C [Hz], is given to the DSP 22 via the buffer circuits $21_1$ to $21_4$ each using N memories of the FIFO, to perform the operation of the DOP using the data signal of C×N [Hz] corresponding to the bit rate of the input signal light $L_{IN}$. However, if the required measurement accuracy of the polarization state can be satisfied, then it is also possible to omit the buffer circuits $21_1$ to $21_4$.

Moreover, in the case where the operation processing in the DSP 22 is relatively simple, the operation processing may be executed in the FPGA 12, to omit the buffer circuits $21_1$ to $21_4$ and the DSP 22. Moreover, an application is also possible where the processing which is to be performed at a latter stage than the A/D conversion circuits $11_1$ to $11_4$ of the time difference correction circuit 10, is executed by the DSP 22, to omit the FPGA 12 and the buffer circuits $21_1$ to $21_4$.

In addition, as the optical system of the polarization state measuring apparatus, one example has been shown in which the configuration similar to that of the prior invention shown in FIG. 7 is applied. However, the configuration of the optical system of the present invention is not limited to this configuration, and the present invention is effective for an arbitrary optical system in which the measurement of the signal light propagated through a plurality of optical paths of different effective lengths is performed in order to measure the polarization state of the input signal light $L_{IN}$.

What is claimed is:

1. An apparatus comprising:
    an optical branching section which branches an input signal light into a plurality of signal lights;
    a plurality of optical components arranged on a plurality of optical branch paths through which the signal lights branched by said optical branching section are propagated, to give polarizations and phase differences which are different from each other, to said respective signal lights;
    a plurality of light receiving elements which receives the signal lights respectively propagated through said optical branch paths, and outputs electrical signals whose levels are changed according to the power of each signal light; and
    operating means processing each of the electrical signals for adjusting at least differences in optical path lengths of said respective optical branch paths.

2. An apparatus according to claim 1,
    wherein said operating means comprises:
    time difference correcting means for receiving the electrical signals output respectively from said light receiving elements, and adjusting timing for outputting the electrical signals according to the differences in the optical path lengths of the optical branch paths, to correct differences in arrival times of the signal lights propagated through said optical branch paths to said light receiving elements; and
    an operation circuit which acquires the information related to a polarization state of said input signal light based on the electrical signals output from said time difference correcting means.

3. An apparatus according to claim 2,
wherein said time difference correcting means temporarily records to store in a plurality of recording sections, the electrical signals respectively output from said light receiving elements, and selects data recorded at different timing in each of said recording sections, according to the differences in the optical path lengths of said optical branch paths, to give the selected data to said operation circuit.

4. An apparatus according to claim 2,
wherein said time difference correcting means gives the electrical signals output from said light receiving elements to a plurality of A/D conversion circuits which performs sampling operations at mutually different timing, to convert the electrical signals into digital data, and selects any one of the data signals output from said A/D conversion circuits, according to the differences in the optical path lengths of said optical branch paths, to give the selected data signal to said operation circuit.

5. An apparatus according to claim 2,
wherein said operation circuit operates Stokes parameters based on data corresponding to said light receiving elements, which is given from said time difference correcting means, to acquire information related to the polarization state of the input signal light.

6. An apparatus according to claim 5,
wherein said operation circuit gives the data corresponding to said light receiving elements, which is given from said time difference correcting means, to a signal processing circuit via buffer circuits each provided with a plurality of memories, and performs operation processing of the Stokes parameters in said signal processing circuit.

7. An apparatus according to claim 1,
wherein said optical branching section branches the input signal light into first to fourth signal lights,
said plurality of optical elements includes:
a ¼ wave plate and a first polarizer which passes therethrough only a polarized component inclined by 45° to a previously set reference plane, which are sequentially arranged on a first optical branch path through which the first signal light is propagated;
a second polarizer which passes therethrough only a polarized component inclined by 45° to said reference plane, which is arranged on a second optical branch path through which the second signal light is propagated; and
a third polarizer which passes therethrough only a polarized component parallel or perpendicular to said reference plane, which is arranged on a third optical branch path through which the third signal light is propagated, and
said plurality of light receiving elements includes:
a first light receiving element which receives the first signal light passed through said ¼ wave plate and said first polarizer;
a second light receiving element which receives the second signal light passed through said second polarizer;
a third light receiving element which receives the third signal light passed through said third polarizer; and
a fourth light receiving element which receives the fourth signal light branched by said optical branching section and propagated through said fourth optical branch path.

8. An apparatus according to claim 7,
wherein a light emitting plane of said ¼ wave plate and a light incident plane of said first polarizer, a light emitting plane of said first polarizer and a light incident plane of said first light receiving element, a light emitting plane of said second polarizer and a light incident plane of said second light receiving element, and a light emitting plane of said third polarizer and a light incident plane of said third light receiving element, are each arranged to be inclined, so as not to be substantially in parallel to each other.

9. An apparatus according to claim 8,
wherein there is provided a shielding section which blocks a stray light generated by the reflection between components with the light incident and emitting planes thereof are arranged to be inclined, from reaching said light receiving element on another optical branch path which is different from the corresponding optical branch path.

10. An apparatus according to claim 7,
wherein said optical branching section includes:
an optical coupler of a first stage which branches the input signal light into a reflected light and a transmitted light at a branching ratio of 1:3;
an optical coupler of a second stage which branches the transmitted light from said optical coupler of the first stage into a reflected light and a transmitted light at a branching ratio of 1:2; and
an optical coupler of a third stage which branches the transmitted light from said optical coupler of the second stage into a reflected light and a transmitted light at a branching ratio of 1:1, and
incident angles of the respective signal lights given to said optical couplers of the first to third stages are set to a predetermined angle away from the Brewster angle.

11. A method comprising:
branching input signal light into a plurality of signal lights;
propagating the signal lights through optical components to provide polarizations and phase differences which are different from each other, to the respective signal lights;
receiving the signal lights respectively propagated, and outputting electrical signals whose levels are varied according to the power of each signal light; and
processing each of the electrical signals to adjust at least differences in optical path lengths of the branched signal lights.

12. The method according to claim 11, wherein said processing comprises:
receiving the electrical signals output respectively in said receiving, and adjusting timing for outputting the electrical signals according to the differences in the optical path lengths of the branch signal lights, to correct differences in arrival times of the propagated signal lights; and
acquiring information related to a polarization state of the input signal light based on the output electrical signals.

* * * * *